United States Patent Office 2,883,286
Patented Apr. 21, 1959

2,883,286

CHOCOLATE FOAM TOPPING AND METHOD

Jay C. Musser, Mount Joy, Pa., assignor to Klein Chocolate Company, Elizabethtown, Pa., a corporation of Pennsylvania No Drawing. Application October 19, 1956
Serial No. 616,940

22 Claims. (Cl. 99—139)

The present invention relates to a chocolate foam topping and the method of producing the same.

A purpose of the invention is to produce a stable chocolate topping which is capable of being dispersed as a foam or whip by compressed gas.

A further purpose is to obtain a heavier body in a foam topping than is possible with foams of the character of whipped cream.

A further purpose is to produce a foam topping which will keep indefinitely without refrigeration and can be dispersed on demand by discharge of foam.

A further purpose is to produce a chocolate foam topping which has the power of stiffening or appreciably setting after it is coated on a dessert or the like.

A further purpose is to form a water-fat or fat-water emulsion, to disperse cocoa material therein, to mix sugar and milk solids therewith and to aerate and dispense the mixture by gas under pressure.

A further purpose is to incorporate in a chocolate foam topping, with suitable mixing and distribution, a component selection of the first class consisting of (a) Cocoa between 5 and 10 percent,
    Fat between 5 and 15 percent,
(b) Chocolate liquor between 5 and 10 percent,
    Cocoa between 1 and 5 percent,
    Fat between 2 and 10 percent, and
(c) Chocolate liquor between 10 and 25 percent, and a component selection of the second class consisting of (a) Sugar between 25 and 40 percent,
    Milk solids between 10 and 20 percent,
    Water between 30 and 48 percent, and
(b) Sugar between 20 and 30 percent,
    Milk solids between 10 and 15 percent,
    Liquid whole milk between 35 and 45 percent, and to expel and aerate the mixture by gas under pressure.

A further purpose is to incorporate in the distribution preferably between 0.2 and 4 percent of stabilizer, preferably between 1 and 3 percent of emulsifier and most desirably both the stabilizer and emulsifier.

Further purposes appear in the specification and in the claims.

In the prior art it has not been possible to produce a satisfactory chocolate foam topping which will remain stable and will keep indefinitely without refrigeration. Many of the foam toppings which have been produced, of the whipped cream variety, have objectionable properties. They are not capable of developing a desirable heavy body at room temperature. They do not stiffen except on loss of taste and flavor. In most cases they will not keep without refrigeration.

As a consequence, the utility of such toppings is limited. For example they are not well suited to serve as icings and coatings for cakes and confectionery and the like which must be shipped.

I have discovered that chocolate flavor can be imparted to a stable foam topping, and that additional very desirable properties can be obtained. The material can be stored for several months without refrigeration, and caused to foam by simply opening a valve. There is a volume increase which can be up to 100 percent on dispensing.

The product when dispersed has considerably more body than whipped cream and the like and will hold its place in a dessert, pudding or sundae.

The stiffening or setting action takes place after dispensing without deterioration in taste and without spoilage, so that the product is well suited to serve as an icing or coating on cakes, confectionery and the like.

One of the great advantages of the product is its convenience, since mixing, cooking, heating or the like at the time of dispensing are entirely unnecessary.

The topping of the invention is maintained in a container of the familiar aerosol type which is used for dispensing whipped cream and similar toppings, by maintaining the contents in contact with a compressed gas such as carbon dioxide or nitrous oxide, the pressure of the gas when the discharge valve is released forcing the topping out through a discharge tube and nozzle and at the same time upon release into the air forming the topping into a foam or froth. Due to the heavy body of the material of the present invention, the individual froth bubbles do not tend to break but hold their shape, thus assuring that the topping will remain expanded for a long period of time.

The topping of the invention is based upon a fat-water or water-fat emulsion which forms the medium and holds the other ingredients.

An important ingredient of the chocolate foam topping of the invention is cocoa material, which may be added as natural or Dutch-process cocoa solids or any mixture thereof or as natural or Dutch-process cocoa liquor, or as a mixture of cocoa solids and cocoa liquor.

Where the cocoa is employed as cocoa solids, fat is also used, suitably in the form of cocoa butter, coconut oil, natural fat such as lard, plastic type shortening, hard butter, hydrogenated vegetable fat or the like or any combination of the same.

Depending upon whether the cocoa material is incorporated as cocoa solids or chocolate liquor, the following alternatives are offered for this first component selection:

(a) Cocoa between 5 and 10 percent
    Fat between 5 and 15 percent
(b) Chocolate liquor between 5 and 10 percent
    Cocoa between 1 and 5 percent
    Fat between 2 and 10 percent, or
(c) Chocolate liquor between 10 and 25 percent.

In addition to the above, sugar is used, suitably in the form of any edible sugar such as sucrose, dextrose, levulose, corn sugar, corn syrup, corn syrup solids, invert sugar or the like, or any mixture or combination of these. Milk solids are also used, either as whole milk solids, buttermilk solids or the like or any combination of the same.

Liquid is also used, either in the form of water such as tap water or distilled water, or in the form of liquid whole milk.

The following alternatives are offered for the second component selection:

(a) Sugar between 25 and 40 percent
    Milk solids between 10 and 20 percent
    Water between 30 and 48 percent
(b) Sugar between 20 and 30 percent
    Milk solids between 10 and 15 percent
    Liquid whole milk between 35 and 45 percent.

Any one of the alternatives of the first component selection may be used with any one of the alternatives of the second component selection above set forth.

The topping of the invention will preferably also contain between 0.2 and 4 percent of stabilizer which may be a protein such as algin, sodium or potassium alginate or the like, egg albumen, soya albumen, starch, hydrated gelatin or refined hydrocolloid such as carrageens.

The chocolate foam topping of the invention also will desirably include between 1 and 3% of emulsifier such as lecithin, or sorbitan monostearate (Span 60), or any other of the edible partial esters of the common edible fatty acids such as lauric, palmitic, stearic, or oleic with hexitol anhydride (hexitans and hexides) derived from sorbitol, or the edible mono- or diesters of edible fatty acids such as lauric, palmitic, stearic or oleic, the esters being glyceryl, propylene glycol, diethylene glycol or polyethylene glycol mono- or diesters (an example being Myverol Type 1800, a distillation product of hydrogenated lard), or the edible acetylated mono- or diglycerides of edible fatty acids in which acetic acid has been added to the edible fatty acids (an example being Myvacet Type 500 made from hydrogenated lard, which contains on the average one long chain lard fatty acid, one acetic acid and one hydroxyl group for each fat molecule).

I will preferably include both a stabilizer and an emulsifier in the proportions set forth above.

There are several different methods of compounding as follows which will be used with any one of the compositions of the invention:

(1) The water soluble ingredients are dissolved in the water or the milk as the case may be. The fat soluble ingredients are dissolved in the fat.

The water phase is added to the fatty phase while mixing in a propeller type mixer. After all the ingredients are dispersed, the complete syrup is mixed in a homogenizer of the colloid mill type. In cases where this composition is used without emulsifier, the emulsifier present in the fat or the chocolate liquor is responsible for forming a stable emulsion.

Where the stabilizer is used, the stabilizer is added by either mixing in the water or adding after mixing that part of the solids and diluting with the water phase.

Where an emulsifier is used, the emulsifier is added either by dissolving it in the fat or the water (depending on which it is soluble in) and then mixing the two phases or adding it alternately with the water to the fat phase.

Where both emulsifier and stabilizer are used, the emulsifier is dissolved either in the fat or the water phase before mixing the emulsion, or added alternately with the water phase to the fat phase.

The stabilizer may be mixed with a small amount of water and then added to the syrup after it is all mixed together or it may be mixed with the solids before they are dissolved in the water.

(2) The second method of mixing is to dissolve the cocoa solids in the fat and build the emulsion with this mixture and part of the water by agitating in a propeller type mixer. The remaining solids other than the cocoa are dissolved in the remaining water and then the emulsion is diluted with this mixture.

After all the ingredients are dispersed, the complete syrup is mixed in a homogenizer of the colloid mill type.

The emulsifier in the fat or in the chocolate liquor is relied upon to build a stable emulsion and no separate emulsifier is used.

Where a stabilizer is used, it may be mixed with part of the water and then added after the entire syrup is mixed, or it may be mixed with some of the solids and then added to the mixture of water and solids before diluting the emulsion with this mixture. Where emulsifier is used it may be dissolved in either the water or the fat, before building the emulsion or it may be added to the fat phase alternately with the water.

Where both emulsifier and stabilizer are used, the emulsifier may be dissolved in either the water or fat phase before building the emulsion, or it may be mixed with the fat alternately with the water phase. The stabilizer may be mixed with part of the water and then added to the entire syrup after it is completedly mixed, or it may be mixed with the solids before they are dissolved in the water.

(3) According to the third method of mixing, the emulsion is first built by fat and water only, using only part of the water and mixing by any suitable technique using a propeller type mixer.

All the solids are dissolved in the remaining water and this mixture is added to the emulsion and thoroughly mixed using a homogenizer of the colloid mill type.

In case a stabilizer is used, it may be added by dissolving it in part of the water and then incorporating this mixture into the other ingredients after all the other ingredients are mixed, or it may be mixed with the other solids before they are dissolved in the water and incorporated with them into the mixture.

In case an emulsifier is used, it may first be dissolved in either the fat or the water, depending upon its solubility before building the emulsion, or it may be added to the fat alternately with the water while building the emulsion.

In case both emulsifier and stabilizer are used, the emulsifier may be dissolved in either the water or the fat phase before building the emulsion, or it may be mixed with the fat alternately with the water phase. The stabilizer may be mixed with part of the water and then added to the entire syrup after the syrup is completely mixed or it may be mixed with the solids before they are dissolved in the water.

(4) In the fourth method of mixing, the solids are added to the fat alternately with the water, thereby building the emulsion and mixing the syrup at the same time, preferably using a propeller type mixer. After all ingredients are dispersed the complete syrup is mixed in an homogenizer of the colloid mill type. In case stabilizer is used, it may be mixed with the solid ingredients before they are added alternately to the fat or it may be mixed with the water.

In case emulsifier is used it may be dissolved in either the fat or the water phase according to its solubility before building the emulsion or it may be added alternately to the fat with the solids and the water.

In case both stabilizer and emulsifier are used, the emulsifier is dissolved in either the fat or the water before building the emulsion, or added alternately with the solids and the water to the fat phase during the building of the emulsion. The stabilizer can be dissolved in a small amount of water and added to the entire syrup after it is all mixed, or it may be mixed with the solids, and then added to the fat phase along with the solids during the building of the emulsion.

Any other method of building the emulsion as well known in the art may be used.

In making up the compositions as explained above, it will be evident that either the fat and water can be made into a water-oil or oil-water emulsion or a mixed emulsion, and then the other ingredients can be dispersed in this emulsion, or, if preferred, the water soluble ingredients such as the sugar and the milk solids may be dissolved in the water or watery material to extent they are soluble and then this mixture can be used to emulsify the fat.

In either case the water-fat or fat-water emulsion acts as a medium to disperse the cocoa solids and carry the sugar and water solids partially dispersed and partially dissolved.

FORMULA RANGE WITHOUT CHOCOLATE LIQUOR AND WITHOUT LIQUID WHOLE MILK

The following formula range is recommended where the chocolate foam topping is to be made up without chocolate liquor and without liquid whole milk, using no emulsifier and no stabilizer:

| | Percent |
|---|---|
| Cocoa | 5 to 10 |
| Fat | 5 to 15 |
| Sugar | 25 to 40 |
| Milk solids | 10 to 20 |
| Water | 30 to 48 |

Where stabilizer is added, the following ingredient is incorporated in addition to the above:

| | Percent |
|---|---|
| Stabilizer | 0.2 to 4 |

Where an emulsifier is added the following ingredient is incorporated in the table:

| | Percent |
|---|---|
| Emulsifier | 1 to 3 |

Where both stabilizer and emulsifier are to be incorporated, the following ingredients are added to the composition above:

| | Percent |
|---|---|
| Stabilizer | 0.2 to 4 |
| Emulsifier | 1 to 3 |

FORMULA RANGE WITH CHOCOLATE LIQUOR

Where both chocolate liquor and cocoa are to be used, the following range of composition is preferably employed:

| | Percent |
|---|---|
| Chocolate liquor | 5 to 10 |
| Cocoa | 1 to 5 |
| Fat | 2 to 10 |
| Sugar | 25 to 40 |
| Milk solids | 10 to 20 |
| Water | 30 to 48 |

Where the chocolate is to be derived entirely from chocolate liquor, the composition is preferably as follows:

| | Percent |
|---|---|
| Chocolate liquor | 10 to 25 |
| Sugar | 25 to 40 |
| Milk solids | 10 to 20 |
| Water | 30 to 48 |

FORMULA RANGE WITH LIQUID WHOLE MILK

Where liquid whole milk is to be used, and the formulation is to be with cocoa, the composition is preferably as follows:

| | Percent |
|---|---|
| Cocoa | 5 to 10 |
| Fat | 5 to 15 |
| Sugar | 20 to 30 |
| Milk solids | 10 to 15 |
| Liquid whole milk | 35 to 45 |

In case it is desired to use liquid whole milk with chocolate liquor, the formulation may be as follows:

| | Percent |
|---|---|
| Chocolate liquor | 5 to 10 |
| Cocoa | 1 to 5 |
| Fat | 2 to 10 |
| Sugar | 20 to 30 |
| Milk solids | 10 to 15 |
| Liquid whole milk | 35 to 45 |

Where the chocolate is derived entirely from chocolate liquor the formulation will desirably be as follows:

| | Percent |
|---|---|
| Chocolate liquor | 10 to 25 |
| Sugar | 20 to 30 |
| Milk solids | 10 to 15 |
| Liquid whole milk | 35 to 45 |

All of the above compositions will preferably be used with stabilizer and with emulsifier in the ranges set forth above.

The detailed examples are set forth in Tables 1 and 1a appearing below.

Considering Tables 1 and 1a, those formulations which use no emulsifier and no stabilizer are the least stable and the least satisfactory. The emulsion is not only in itself less stable but the entire syrup does not have a body of optimum quality, although it is satisfactory by commercial standards.

Those formulations set forth in the tables which use stabilizers without any emulsifier are less stable than those in which an emulsifier is used, but are of improved body as compared with those having no stabilizer and no emulsifier. Those formulations having the emulsifier without the stabilizer have a very stable emulsion but the body of the syrup after mixing is rather too light for optimum results.

The formulations in which both the emulsifier and the stabilizer are used are decidedly preferable, because not only is the final product extremely stable, but it has an optimum body.

Each of the examples in the tables referring to an emulsifier was carried out using each of the following emulsifiers:

Lecithin
Span 60
Myverol Type 1800
Myvacet Type 500

The results were comparable in every case although lecithin gave the best results.

Each one of the examples in the tables which refer to a stabilizer was carried out using each of the following stabilizers:

Algin
Sodium alginate
Egg albumen
Soya albumen
Starch
Hydrated gelatine
Refined hydrocolloids obtained from sea plants, mainly Irish moss or carrageen being essentially mixed salts of polysaccharide sulphate. Galactose units account for approximately two thirds of the organic matter and the remaining units are six carbon sugars of undetermined structure.

Comparable results were obtained with the above stabilizers although the refined hydrocolloids gave somewhat better results.

The topping when finally made is placed in a gas pressure dispenser of the aerosol type in contact with a compressed gas such as carbon dioxide or nitrous oxide.

In this form in contact with the gas under pressure the product need not be kept under refrigeration. Under careful manufacturing technique, it is sterile from a bacteriological standard and the high gas pressure tends to keep the product from spoiling.

The housewife or other user merely has to press the valve handle and the compressed gas forces the topping out the discharge opening and at the same time the stream of gas through the discharging topping aerates it and forms a chocolate foam.

The relatively stiff body of the composition tends to hold the gas bubbles and prevent the foam from "dropping" or losing its aeration. The stiff body also tends to make the foam remain in place on cakes, confectionery, puddings, ice cream or the like or when used as a sauce on desserts.

The presence of the milk solids aids in foaming.

The sugar contributes to the body and the stiffness.

One of the remarkable features of the product of the invention is that it tends to stiffen after it is dispensed. It is believed that this stiffening action is due to formation of interlocking crystals by the sugar. At the same time the stiffened composition retains its smoothness and its creamy taste on icings and the like.

The topping of the invention is stable without refrigeration and has a shelf life of at least 3 months.

In view of my invention and disclosure, variations and modifications to meet individual whim or particular need will doubtless become evident to others skilled in the art, to obtain all or part of the benefits of my invention without copying the process and composition shown, and I, therefore, claim all such insofar as they fall within the reasonable spirit and scope of my claims.

Table 1
PERCENTAGES BY WEIGHT

| Example | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| Cocoa | 5 | 10 | 5 | 10 | 5 | 10 |  |  | 5 | 10 | 1 | 5 | 1 | 5 | 1 | 5 |  |  |  |  |  |  |
| Chocolate liquor |  |  |  |  |  |  | 5 | 10 | 1 | 5 | 5 | 10 | 5 | 10 | 5 | 10 | 10 | 25 | 10 | 25 | 10 | 25 |
| Fat | 5 | 15 | 5 | 11 | 5 | 12 |  |  | 5 | 10 | 2 | 10 | 2 | 10 | 2 | 10 |  |  |  |  |  |  |
| Sugar | 40 | 25 | 40 | 25 | 40 | 25 | 40 | 25 | 37 | 25 | 37 | 25 | 37 | 25 | 37 | 25 | 40 | 25 | 40 | 25 | 39 | 25 |
| Milk solids | 10 | 20 | 10 | 20 | 10 | 20 | 10 | 15 | 10 | 20 | 10 | 16 | 10 | 17 | 10 | 13 | 20 | 10 | 19.8 | 10 | 20 | 10 |
| Liquid whole milk |  |  |  |  |  |  |  |  |  |  |  |  |  |  |  |  |  |  |  |  |  |  |
| Water | 40 | 30 | 39.8 | 30 | 39 | 30 | 38.8 | 35 | 45 | 30 | 44.8 | 30 | 44 | 30 | 43.8 | 30 | 30 | 40 | 30 | 36 | 30 | 37 |
| Stabilizer |  |  | 0.2 | 4 |  |  | 0.2 | 4 |  |  | 0.2 | 4 |  |  | 0.2 | 4 |  |  | 0.2 | 4 |  |  |
| Emulsifier |  |  |  |  | 1 | 3 | 1 | 3 |  |  |  |  | 1 | 3 | 1 | 3 |  |  |  |  | 1 | 3 |

Table 1a
PERCENTAGES BY WEIGHT

| Example | 23 | 24 | 25 | 26 | 27 | 28 | 29 | 30 | 31 | 32 |
|---|---|---|---|---|---|---|---|---|---|---|
| Cocoa |  |  | 5 | 10 | 5 | 10 | 5 | 5 |  |  |
| Chocolate liquor | 10 | 25 |  |  |  |  |  |  | 5 | 10 |
| Fat |  |  | 5 | 15 | 5 | 11 | 5 | 15 | 5 | 15 |
| Sugar | 38.8 | 25 | 30 | 30 | 29.8 | 30 | 29 | 30 | 26.8 | 25 |
| Milk solids |  | 10 | 15 | 10 | 15 | 10 | 15 | 10 | 15 | 25 |
| Liquid whole milk |  |  | 45 | 35 | 45 | 35 | 45 | 42 | 45 | 35 |
| Water | 30 | 33 |  |  |  |  |  |  |  |  |
| Stabilizer | 0.2 | 4 |  |  | 0.2 | 4 |  |  | 0.2 | 4 |
| Emulsifier | 1 | 3 |  |  |  |  | 1 | 3 | 1 | 1 |

Having thus described my invention, what I claim as new and desire to secure by Letters Patent is:

1. The method of producing a chocolate foam topping, which comprises mixing and dispersing together a component selection of the first class consisting of:

(a) Cocoa between 5 and 10 percent
  Fat between 5 and 15 percent,
(b) Chocolate liquor between 5 and 10 percent
  Cocoa between 1 and 5 percent
  Fat between 2 and 10 percent, and
(c) Chocolate liquor between 10 and 25 percent, and a component selection of the second class consisting of:

(a) Sugar between 25 and 40 percent
  Milk solids between 10 and 20 percent
  Water between 30 and 48 percent, and
(b) Sugar between 20 and 30 percent
  Milk solids between 10 and 15 percent
  Liquid whole milk between 35 and 45 percent, and expelling and aerating the mixture by gas under pressure.

2. The method of claim 1, which comprises dissolving the water soluble ingredients in the liquid material, dissolving the fat soluble ingredients in the fat, and adding the water phase thus produced to the fat phase thus produced while mixing.

3. The method of claim 2, which comprises incorporating in the mixture prior to the dispersion between 0.2 and 4 percent of stabilizer.

4. The method of claim 2, which comprises incorporating in the mixture prior to the dispersion between 1 and 3 percent of emulsifier.

5. The method of claim 1, which comprises dissolving the cocoa solids in the fat, building the emulsion with this mixture and part of the water, dissolving the remaining solids, other than the cocoa solids, in the remaining water, and then diluting the emulsion with this mixture.

6. The method of claim 5, which comprises incorporating in the mixture prior to the dispersion between 0.2 and 4 percent of stabilizer.

7. The method of claim 5, which comprises incorporating in the mixture prior to the dispersion between 1 and 3 percent of emulsifier.

8. The method of claim 1, which comprises first building the emulsion with the fat and part of the water, dissolving all of the solids in the remaining water, then adding the mixture thus produced to the emulsion with mixing.

9. The method of claim 8, which comprises incorporating in the mixture prior to the dispersion between 0.2 and 4 percent of stabilizer.

10. The method of claim 8, which comprises incorporating in the mixture prior to the dispersion between 1 and 3 percent of emulsifier.

11. The method of claim 1, which comprises adding the solids to the fat and alternately to the water and concurrently mixing together the fat and the water.

12. The method of claim 11, which comprises incorporating in the mixture prior to the dispersion between 0.2 and 4 percent of stabilizer.

13. The method of claim 11, which comprises incorporating in the mixture prior to the dispersion between 1 and 3 percent of emulsifier.

14. The method of claim 1, which comprises incorporating in the mixture prior to the dispersion between 0.2 and 4 percent of stabilizer.

15. The method of claim 1, which comprises incorporating in the mixture prior to the dispersion between 0.2 and 4 percent of stabilizer and between 1 and 3 percent of emulsifier.

16. A stable dispersed chocolate foam topping comprising a dispersion of a component selection of the first class consisting of:

(a) Cocoa between 5 and 10 percent
  Fat between 5 and 15 percent,
(b) Chocolate liquor between 5 and 10 percent
  Cocoa between 1 and 5 percent
  Fat between 2 and 10 percent, and
(c) Chocolate liquor between 10 and 25 percent, and a component selection of the second class consisting of:

(a) Sugar between 25 and 40 percent
  Milk solids between 10 and 20 percent
  Water between 30 and 48 percent, and
(b) Sugar between 20 and 30 percent
  Milk solids between 10 and 15 percent
  Liquid whole milk between 35 and 45 percent, all percentages being by weight, in combination with compressed gas adapted to expel and aerate the topping.

17. A topping of claim 16, comprising between 0.2 and 4 percent of stabilizer.

18. A topping of claim 16, comprising between 1 and 3 percent of emulsifier.

19. A topping of claim 18, comprising between 0.2 and 4 percent of stabilizer.

20. A stable dispersed chocolate foam topping comprising between 5 and 10 percent of chocolate liquor, between 1 and 5 percent of cocoa, between 2 and 10 percent of fat, between 25 and 40 percent of sugar, between 10 and 20 percent of milk solids, and between 30 and 48 percent of water, all percentages being by weight, in combination with compressed gas adapted to expel and aerate the topping.

21. A stable dispersed chocolate foam topping comprising between 10 and 25 percent of chocolate liquor, between 25 and 40 percent of sugar, between 10 and 20 percent of milk solids and between 30 and 48 percent of water, all percentages being by weight, in combination with compressed gas adapted to expel and aerate the topping.

22. A stable dispersed chocolate foam topping comprising between 5 and 10 percent of cocoa, between 5 and 15 percent of fat, between 20 and 30 percent of sugar, between 10 and 15 percent of milk solids, and between 35 and 45 percent of liquid whole milk, in combination with compressed gas, adapted to expel and aerate the topping.

References Cited in the file of this patent

UNITED STATES PATENTS

| | | |
|---|---|---|
| 2,294,172 | Getz | Aug. 25, 1942 |
| 2,474,019 | Steiner et al. | June 21, 1949 |
| 2,487,698 | Diamond | Nov. 8, 1949 |
| 2,598,282 | Melnick | May 27, 1952 |